Aug. 8, 1933.  E. J. FARKAS  1,921,287
BRAKE
Filed March 16, 1931
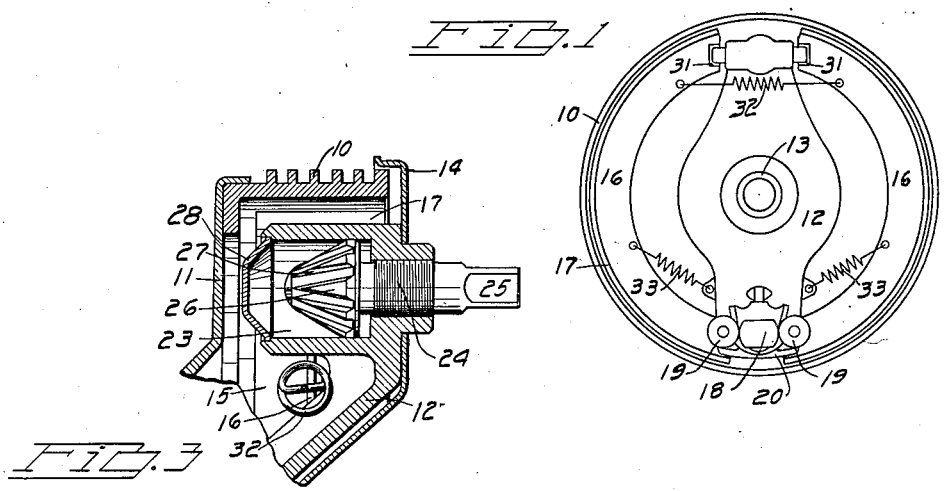
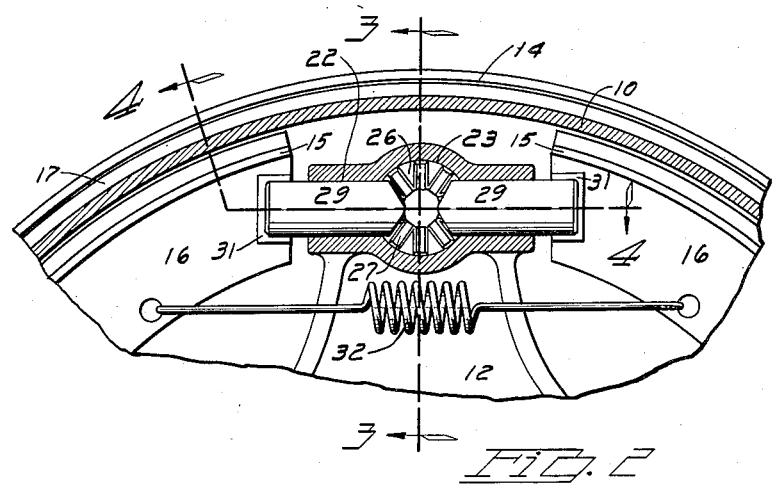
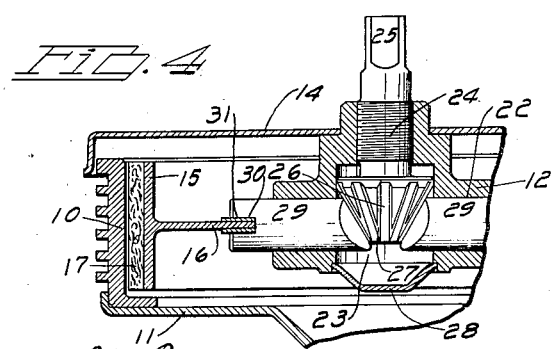
INVENTOR.
E. J. Farkas
BY
ATTORNEY.

UNITED STATES PATENT OFFICE 1,921,287

BRAKE

Eugene J. Farkas, Detroit, Mich., assignor to Ford Motor Company, Dearborn, Mich., a Corporation of Delaware Application March 16, 1931. Serial No. 522,871

4 Claims. (Cl. 188—79.5)

The object of my invention is to provide a brake especially adapted for use in motor vehicles, which brake will be simple and reliable in operation, cheap to manufacture, and of durable construction. More particularly, the invention disclosed herein relates to internal expanding two shoe brakes wherein improved means are provided for spreading one pair of adjacent brake shoe ends to adjust the brake shoes for wear. This device consists of a pair of aligned studs reciprocally mounted in the brake anchor plate which studs are adapted to be spread apart lengthwise by means of a wedge interposed between their adjacent ends. The outer ends of these studs are slotted in the plane of the brake to directly receive the brake shoe webs, thereby operatively spreading one pair of adjacent shoe ends to compensate for brake lining wear.

Although this device is unfailing in operation and provides a simple and positive brake adjustment, its chief merit lies in its inexpensive construction, inasmuch as the manufacturing cost of this device is only a fraction of that of equivalent brake adjusting devices.

With these and other objects in view, my invention consists in the arrangement, construction and combination of the various parts of my improved device, as described in the specification, claimed in my claims, and illustrated in the accompanying drawing, in which:

Figure 1 shows a diagrammatic plan view of a brake having my improvements incorporated therein.

Figure 2 shows an enlarged sectional view through the brake adjusting device shown in Figure 1.

Figure 3 shows a sectional view taken on the line 3—3 of Figure 2, and

Figure 4 shows a sectional view taken on the line 4—4 of Figure 2.

Referring to the accompanying drawing, I have used the reference numeral 10 to indicate a brake drum, such as is commonly associated with the braking wheels of automobiles. The brake drum shown is of two piece construction with the braking portion secured to the rim of a brake drum web 11, but if desired, the drum 10 and web 11 may be formed integrally, either as a casting or a stamping, inasmuch as the drum is not part of this invention and because any of the numerous types of brake drums ordinarily employed in such vehicles can be used with my improved brake mechanism.

A brake anchor member 12 is non-rotatably mounted on the vehicle axle 13 and an annular dust plate 14 extends radially from the anchor 12 to form an enclosure with the brake drum. It is within this enclosure that my improved brake is mounted. A pair of rigid brake shoes 15, preferably formed from T section stock having a central integral web 16, are supported on the anchor 12. These shoes are each provided with brake linings 17 in position to co-act with the inside of the drum 10. It will be noted that each of my brake shoes are of somewhat less than a half circle in length so that when placed inside of the brake drum sufficient space is allowed between one pair of adjacent shoe ends to house a brake shoe actuating device, while the space between the opposite pair of adjacent shoe ends is occupied by my improved brake adjusting device. Substantially the same procedure is used to adjust the brakes as is used to actuate or apply them, that is, the spreading of one pair of adjacent brake shoe ends; however, for simplicity the opposite pairs of shoe ends are used for these respective operations, the upper pair of ends being separated for adustment while the lower pair of ends are separated for actuation.

The brake applying device used herein consists of a simple reciprocating wedge 18 mounted between pairs of spaced rollers 19 which are pivotally secured to each of one pair of adjacent brake shoe ends. Other operating devices such as toggle links, or similar devices may be used if desired, the only essential function being that the adjacent brake shoe ends should be separated to apply the brakes.

The feature of my invention which I desire to cover by this application is the means for spreading and thereby adjusting the opposite pair of brake shoe ends. This adjusting device is mounted on the upper end of the brake anchor between the brake shoe ends. The anchor is provided with a straight bore 22 in the plane of the webs 16 and which is tangent to the mean circumference of the shoes. A second bore 23 is provided in the anchor parallel to the wheel axis and which intersects the center of the bore 22. An adjusting cone 24 is threaded into the bore 23 to thereby slowly reciprocate therein as it is rotated. In order to so rotate this member its outer end is squared, as at 25, while its inner end is provided with a conical head 26 having a plurality of notches 27 equally spaced therearound machined from the point of the cone straight down to the base. A plug 28 is secured in the outer end of the bore 23 to form an enclosure for the head 26, which enclosure may be packed with grease to form a permanent source of lubrication for the conical head member.

It will be noted that the head 27 intersects the bore 22 at its center whereby a pair of studs 29 are inserted from each end of the bore 22, their inner ends having diagonal knife edges machined thereon which co-act with the notches 27. The outer ends of each of these studs are provided with slots 30 machined therein which extend diametrically through the respective stud transversely to the knife edge. The adjusting ends of the brake shoe webs 16 may, if desired, be directly inserted in these slots, however, it is thought preferable to weld a pair of reinforcing plates 31 to the sides of each web which plates may be surface machined to just the width of the slot 30 so that better bearings for the web are provided.

When the brake shoe ends are inserted in these slots a spring 32 is tensioned between the shoe ends thereby resiliently drawing the brake shoe webs against the bottom of the slots and forcing the studs 29 against the conical head 26. Both axial and rocking movement of the brake shoes are resisted by these slots so that no other device for this purpose is necessary or desirable.

I have provided tension springs 33 to actuate the opposite ends of the brake shoes which springs are so arranged that they draw the shoes down against a stop 20 secured to the lower end of anchor 12 when the brake is in its inoperative position. It will thus be seen that these springs, 32 and 33, draw the upper ends of the shoes both together and away from the brake drum to thereby maintain a fixed clearance between the shoes and the drum. When the lower or operable ends of the brake shoes are spread the adjustable ends slide upwardly in a radial direction in the slots 30 thereby contacting with the drum over the full periphery of the shoes.

The operation of my device for securing the correct adjustment on all four brakes is of particular importance. This function is obtained because when the adjusting member is rotated the studs 29 are reciprocated in and out of the bore 22 a distance corresponding to the depth of the notches 27. It is apparent that when the member is tightened through one notch the outward movement of the studs is slightly greater than the return inward movement because of the axial movement of the cone so that the difference between these two paths constitutes the adjustment for each notch through which the cone is rotated.

The adjusting member 24 may be tightened as far as possible at which time the further rotation of the member will be prevented by the brake shoes striking the brake drum before the knife edges can over-ride the cone between the notches. It will be seen that if at this time the adjusting device is backed off to the first notch by a slight movement of the operating wrench a definite fixed clearance is obtained between the shoes and the brake drum. The depth of these notches may be so proportioned that any desired clearance can be accurately obtained through this method, which makes this brake adjusting device particularly advantageous for the use of car owners themselves or inexperienced mechanics. The important function of the device is that the four brakes of the car can all be adjusted to an equal brake shoe clearance by simply turning the adjusting devices as far as they will go.

Among the many advantages arising from the use of my improved device it may be well to mention that my improved adjusting device forms means for both spreading the adjustable ends of the brake shoes and for supporting and guiding the shoes in their inoperative positions. It further permits radial movement of the brake shoe ends so that the full periphery of the shoe may engage the brake drum.

Perhaps the greatest advantage resulting from the use of this device arises because of its cheapness to manufacture. The studs 29 are formed directly from cold rolled stock with only a minimum of machining, while the brake anchor member need only be provided with two straight intersecting bores and the one conical adjusting member. Such structure is very inexpensive when compared with the elaborate and costly brake adjusting mechanisms heretofore employed and further is of such rigid and solid construction that the brake chatter so frequently caused by the more delicate and fragile brake adjusting mechanism is entirely prevented.

Some changes may be made in the arrangement, construction, and combination of the various parts of my improved device without departing from the spirit of my invention, and it is my intention to cover by my claims such changes as may reasonably be included within the scope thereof.

I claim as my invention:—

1. A brake comprising a brake drum and brake anchor, an internal brake shoe having a reinforcing web disposed in the plane of the shoe, a stud mounted in said anchor having its axis lying in the plane of said reinforcing web, one end of said stud being slotted to receive said web whereby radial movement of the web in the slot is permitted so that the adjacent end of said shoe may move radially into engagement with the brake drum when the brake is applied, and means for resiliently returning said shoe to obtain clearance between the anchored end of the shoe and the brake drum when the brake is released.

2. A brake comprising a brake drum and brake anchor, an internal brake shoe having a reinforcing web disposed in the plane of the shoe, a stud slideably mounted in said anchor having its axis lying in the plane of the reinforcing web, one end of said stud being slotted to directly receive said web whereby radial movement of the web in the slot is permitted so that the anchored end of said shoe may move radially into engagement with the brake drum when the brake is applied, and resilient means for urging said anchored shoe end inwardly to obtain clearance between the shoe and drum when the brake is released.

3. A brake comprising a brake drum and brake anchor, an internal brake shoe having a central reinforcing web disposed in the plane of the shoe, a stud mounted in said anchor having its axis lying in the plane of said reinforcing web, the unanchored end of said stud being slotted to directly receive said web whereby radial movement of the web in the slot is permitted so that the anchored end of said shoe may move radially into contact with the brake drums when the brake is applied, and both axial and circumferential movement of said shoe is prevented by said slot, and means for resiliently urging the anchored end of said shoe to position wherein clearance between the shoe and drum is obtained when the brake is released.

4. A brake comprising a brake drum and brake anchor, a pair of internal brake shoes having reinforcing webs in the plane of said shoes, a pair of oppositely extending anchor studs having their adjacent ends secured in said anchor, said studs lying in the plane of the reinforcing web and having their opposite ends slotted to directly receive one pair of adjacent shoe web ends whereby radial movement of said ends in the slots is permitted and axial movement thereof is prevented, whereby said anchored ends may move radially into engagement with the brake drum when the brake is applied, and resilient means for urging said shoe inwardly from the drum to obtain clearance between the anchored ends and said drum when the brake is released.

EUGENE J. FARKAS.